(12) United States Patent
Sato et al.

(10) Patent No.: US 7,515,203 B2
(45) Date of Patent: Apr. 7, 2009

(54) IMAGE CAPTURE APPARATUS

(75) Inventors: Tsuneo Sato, Saitama (JP); Atsuhiko Ishihara, Saitama (JP)

(73) Assignee: Fujifilm Corporation, Tokyo (JP)

( * ) Notice: Subject to any disclaimer, the term of this patent is extended or adjusted under 35 U.S.C. 154(b) by 742 days.

(21) Appl. No.: 11/091,398

(22) Filed: Mar. 29, 2005

(65) Prior Publication Data

US 2005/0219398 A1    Oct. 6, 2005

(30) Foreign Application Priority Data

Mar. 30, 2004    (JP) .............................. 2004-100656

(51) Int. Cl.
H04N 5/225    (2006.01)
(52) U.S. Cl. .................................... 348/374
(58) Field of Classification Search ................ 348/340, 348/257, 294, 373–376; 438/127
See application file for complete search history.

(56) References Cited

U.S. PATENT DOCUMENTS

| | | | | |
|---|---|---|---|---|
| 4,616,895 A | * | 10/1986 | Yoshizaki et al. | 439/330 |
| 5,588,847 A | * | 12/1996 | Tate | 439/71 |
| 5,731,222 A | * | 3/1998 | Malloy et al. | 438/113 |
| 6,028,774 A | * | 2/2000 | Shin et al. | 361/764 |
| 6,147,389 A | * | 11/2000 | Stern et al. | 257/434 |
| 6,483,101 B1 | * | 11/2002 | Webster | 250/216 |
| 6,483,179 B2 | | 11/2002 | Iizimia et al. | |
| 6,777,767 B2 | | 8/2004 | Badehi | |
| 7,253,388 B2 | * | 8/2007 | Kuhmann et al. | 250/208.1 |
| 2001/0018236 A1 | * | 8/2001 | Badehi | 438/127 |
| 2002/0158985 A1 | * | 10/2002 | Saitoh et al. | 348/340 |
| 2003/0034569 A1 | * | 2/2003 | Caletka et al. | 257/796 |
| 2004/0251790 A1 | * | 12/2004 | Masuko et al. | 310/348 |
| 2005/0174468 A1 | * | 8/2005 | Herranen et al. | 348/340 |
| 2005/0270403 A1 | * | 12/2005 | Adachi et al. | 348/340 |

FOREIGN PATENT DOCUMENTS

| | | | |
|---|---|---|---|
| EP | 1 081 944 A2 | | 3/2001 |
| JP | 2001237347 | * | 8/2001 |
| JP | 2003-230028 | | 8/2003 |

OTHER PUBLICATIONS

Title: Installing Your CPU Date: Wayback Machine dates to Aug. 3, 2002 Website: BuildYourOwnComputer.Net (http://www.buildyourowncomputer.net/step3.html) Pertinent Section Titled: Installing a socket style CPU.*

* cited by examiner

Primary Examiner—Timothy J Henn
(74) Attorney, Agent, or Firm—McGinn IP Law Group, PLLC

(57) ABSTRACT

A mounting board has a thickness L2 being thicker than a thickness L1 of a solid state imaging device. In the mounting board, an attachment opening for containing the solid state imaging device is formed. In addition, a side surface of the solid state imaging device is a tapered surface having an inclination angle θ1, and an internal surface of the attachment opening is a tapered surface having an inclination angle θ2 larger than the inclination angle θ1. On the side surface of the solid state imaging device and the internal surface of the attachment opening respectively, contact terminals are provided for electrically connecting the solid state imaging device and the mounting board, when the contact terminals contact each other according to insertion of the solid state imaging device into the attachment opening.

15 Claims, 5 Drawing Sheets

IMAGE CAPTURE APPARATUS

BACKGROUND OF THE INVENTION

1. Field of the Invention

The present invention relates to an image capture apparatus having a solid state imaging device attached to a mounting board.

2. Description Related to the Prior Art

A mobile phone which incorporates a digital camera so as to easily capture images is in widespread use. For example, European Patent Laid-Open Publication No. 1081944 and Japanese Patent Laid-Open Publication No. 2003-230028 disclose camera modules each of which is formed such that a solid state imaging device, an optical unit incorporating an image taking optical system and a mounting board having a control circuit thereon are preassembled as a unit, for being easily incorporated in a small electronic apparatus such as a mobile phone.

The solid state imaging device comprises a bare chip obtained such that a light receiving portion and electrode pads are formed on a semiconductor substrate made of silicon, a package for containing the bare chip, and a cover glass for sealing an opening of the package without blocking incidence of light toward the light receiving portion. The bare chip and the package are connected by wire bonding. In the camera module, the solid state imaging device is soldered on the mounting board, and the optical unit is fixed on the package or the mounting board with adhesive.

As a packaging method to downsize the solid state imaging device, a wafer-level chip size package (hereinafter WLCSP) is known. In the WLCSP, a semiconductor device is obtained by dicing a wafer after packaging in a semiconductor wafer process. As described in U.S. Pat. No. 6,483,179, the WLCSP can drastically reduce the size of a solid state imaging device in comparison with the conventional ceramic packaging.

The solid state imaging device in a conventional package is large in overall size (project area in an optical axis direction) and in length in the optical axis direction (thickness). Therefore, a camera module or a mobile phone which incorporates the solid state imaging device is hardly reduced in size. If the solid state imaging device of WLCSP type is incorporated in the camera module, the camera module becomes smaller than another one in which the conventional solid state imaging device is incorporated. However, the camera module is required to further reduce its size such that the mobile phone can be downsized and reduced in thickness.

SUMMARY OF THE INVENTION

An object of the present invention is to reduce the thickness of an image capture apparatus where a solid state imaging device is mounted on a mounting board.

In order to achieve the above object and the other objects, in an image capture apparatus of the present application, a mounting board has a thickness larger than that of a solid state imaging device, and an attachment opening is formed in the mounting board, for containing the solid state imaging device within the thickness of the mounting board. In addition, a plurality of first contact terminals are formed on a side surface of the solid state imaging device, and a plurality of second contact terminals are formed on an internal surface of the attachment opening, such that these contact terminals contact each other for electrically connecting between the solid state imaging device and the mounting board.

The side surface of the solid state imaging device is a first tapered surface which has a first inclination angle, the internal surface of the attachment opening is a second tapered surface which has a second inclination angle larger than the first inclination angle, and the bottom surface of the solid state imaging device has a size larger than that of an upper end of the attachment opening, and smaller than that of a lower end of the attachment opening. In addition, a first indicator is provided on the solid state imaging device, for indicating a position of a first terminal which is one of the first contact terminals, and a second indicator is provided on the mounting board, near the attachment opening, for indicating a position where the first terminal is attached to the attachment opening.

According to the image capture apparatus of the present invention, because the solid state imaging device is contained within the thickness of the mounting board, a length of the image capture apparatus in an optical axis direction can be reduced by a thickness of the solid state imaging device. Further, telephoto lenses or zoom lenses can be incorporated in the image capture apparatus without increasing thickness of the apparatus, when these lenses are in the space gained by the solid state imaging device being contained inside the mounting board.

Since the solid state imaging device and the mounting board are wired in the attachment opening, it is prevented that the thickness of the image capturing apparatus becomes increased by the wiring protruding on the mounting board. Further, the side surface of the solid state imaging device and the internal surface of the attachment opening can be surely contacted by inserting the solid state imaging device into the attachment opening, because the side surface of the solid state imaging device is the tapered surface, the internal surface of the attachment opening is the tapered surface which has the inclination angle larger than that of the side surface of the solid state imaging device, and the bottom surface of the solid state imaging device has the size larger than that of the upper end of the attachment opening, and smaller than that of the lower end of the attachment opening. In addition, since the indicator for distinguishing the first terminal is provided on the solid state imaging device, and the other indicator is provided on the mounting board for indicating a position where the first terminal is attached to the attachment opening, therefore it is prevented that the solid state imaging device is improperly attached to the mounting board.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
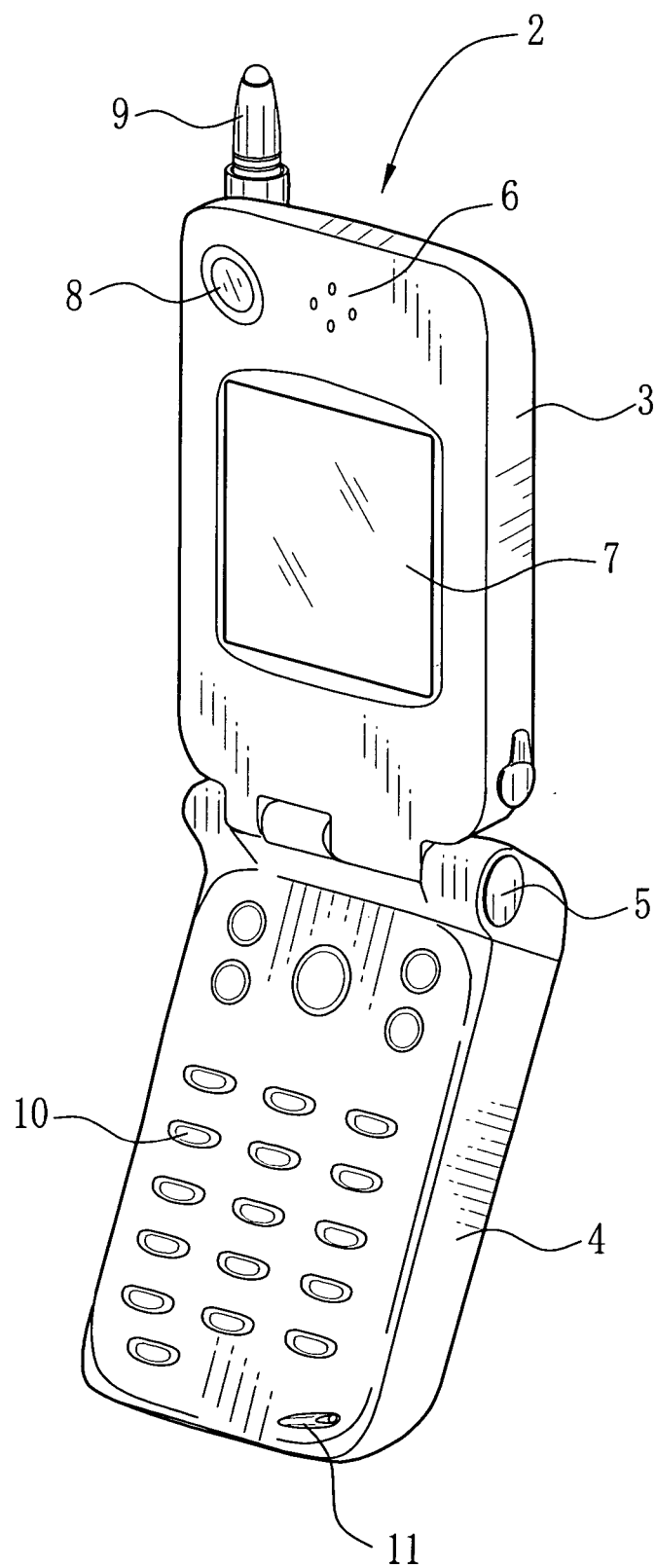
FIG. 1 is a perspective view of a mobile phone to which the present invention is applied.

As shown in FIG. 1, a mobile phone 2 comprises a receiver unit 3 and a transmitter unit 4, which are connected by a hinge in a foldable manner. The receiver unit 3 provides a voice output section 6 for outputting received voice which is amplified, a display 7 for displaying various information, an image capture section 8 for capturing object images, and an antenna 9. The transmitter unit 4 provides operation buttons for operating the mobile phone 2, and a voice input section 11 for inputting voice for transmission.

Figure 2:
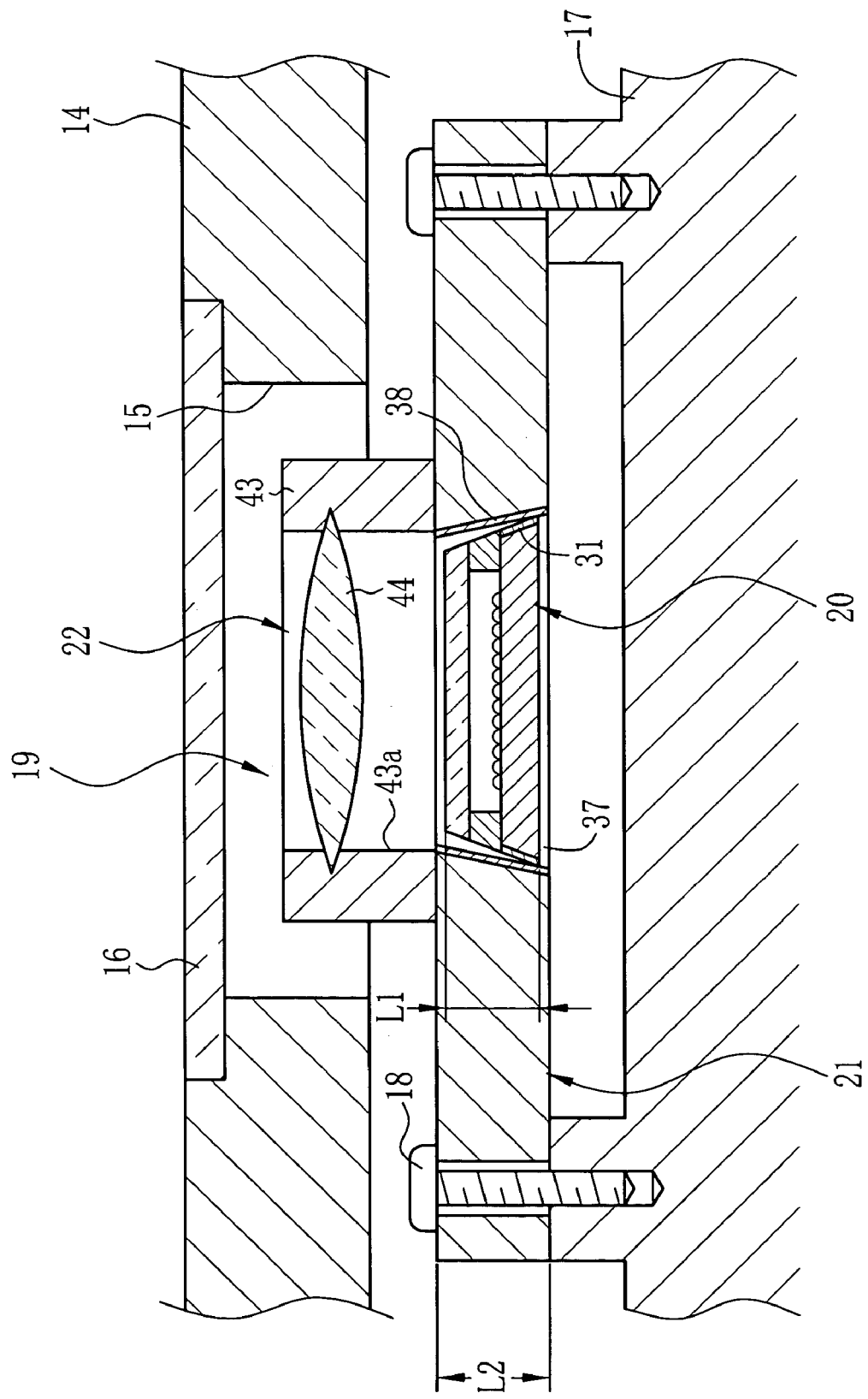
FIG. 2 is a partially sectional view of an image capture section of the mobile phone.
Figure 3:
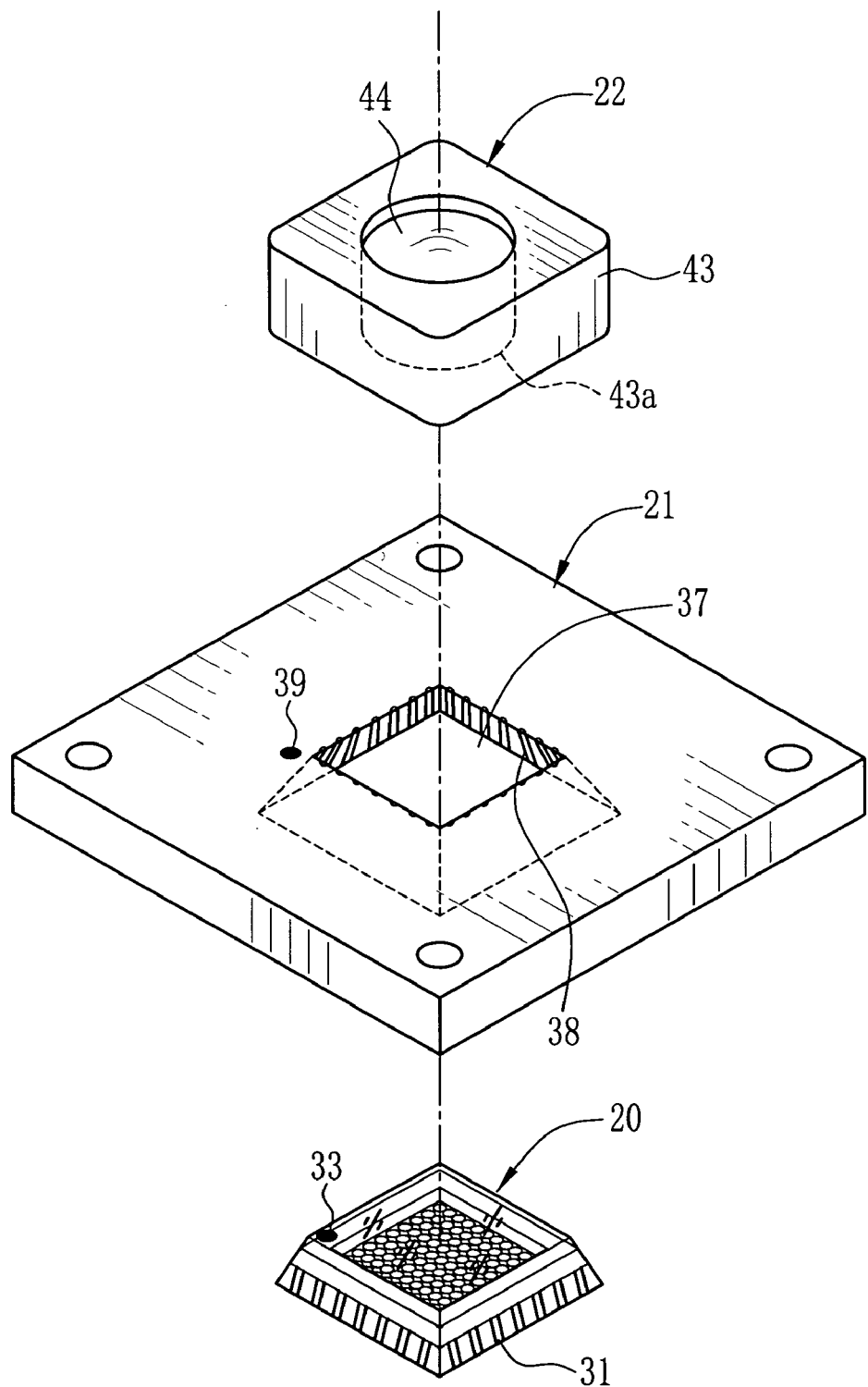
FIG. 3 is an exploded perspective view of a camera module.

As shown in FIG. 2, an outer cover 14 of the mobile phone 2 has an opening 15 for image capturing. The opening 15 is covered by a protection plate 16 which is formed of transparent plastic or the like. Below the opening 15, a camera module 19 is fixed to a frame 17 of the mobile phone 2 by plural screws 18. As shown in FIG. 3, the camera module 19 comprises a solid state imaging device 20 of WLCSP type, a mounting board 21 and an optical unit 22.

Figure 4:
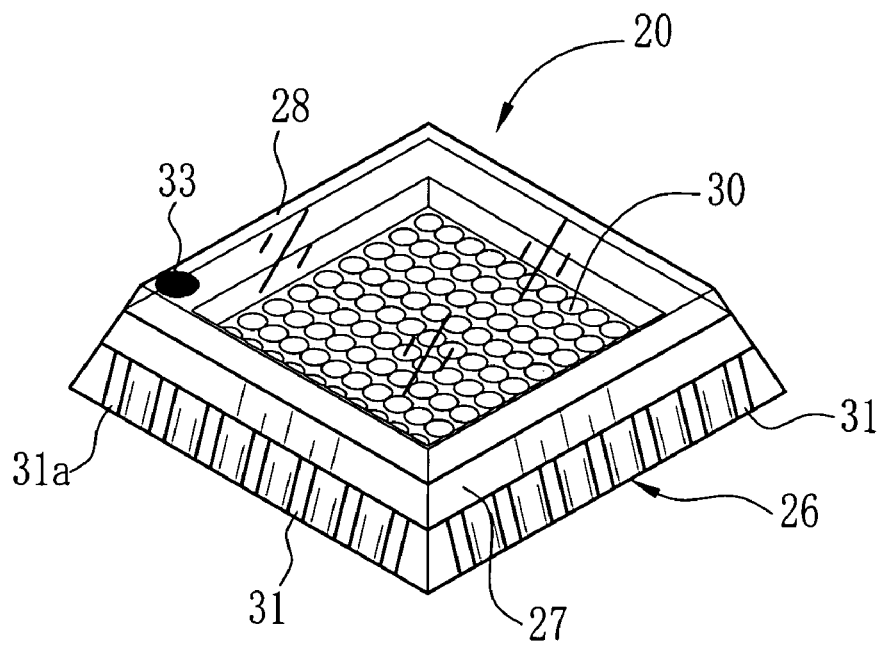
FIG. 4 is a perspective view of a solid state imaging device.
Figure 5:
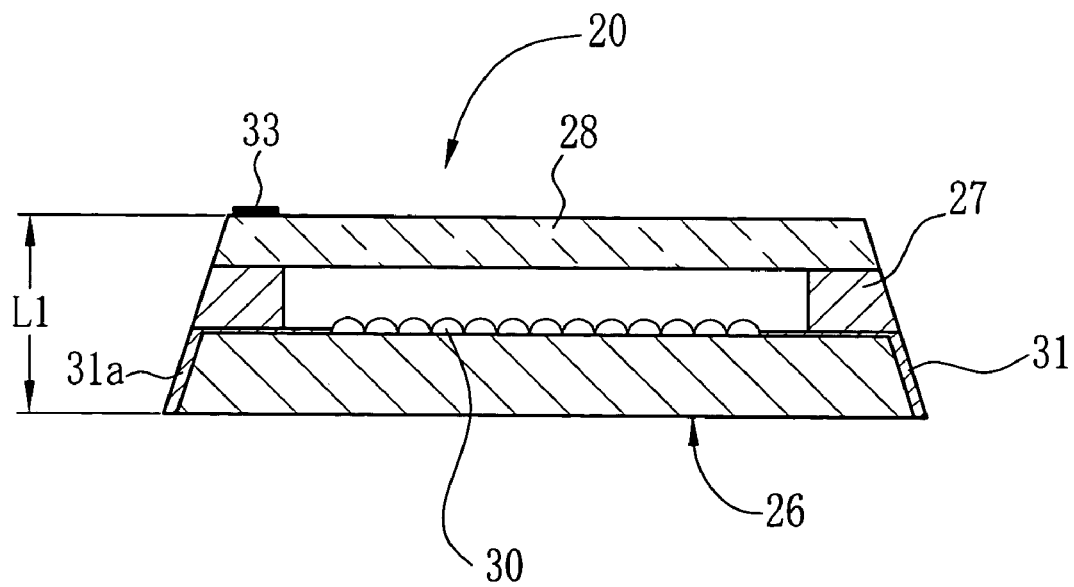
FIG. 5 is a partially sectional view of the solid state imaging device.

As shown in FIG. 4 and FIG. 5, the solid state imaging device 20 is constructed of a semiconductor substrate 26, a frame-like spacer 27 which is adhered on the semiconductor substrate 26 with an adhesive, and a cover glass 28 which is adhered above the spacer 27 so as to seal inside the spacer 27. Side surfaces of the solid state imaging device 20 are tapered surfaces which is narrowed from the semiconductor substrate to the cover glass 28.

On the top surface of the semiconductor substrate 26, a light receiving portion 30 is provided. The light receiving portion 30 is a CCD (charge coupled device) type, on which plural pixels (photodiodes) are formed. A micro lens and color filters are superimposed on the each pixel, as well known. On the side surfaces of the semiconductor substrate 26, a plurality of contact terminals 31 which electrically connect the light receiving portion 30 are provided. The contact terminals 31 are formed such that conductive materials are printed on the semiconductor substrate 26, for example.

One of the contact terminals 31, to which a numeral 31a is applied, is a first terminal which acts as a fiducial for determining attachment orientation of the solid state imaging device 20. A mark 33 which indicates the position of the first terminal 31a is formed by printing or the like, at a position on the cover glass 28 where the spacer 27 faces.

The spacer 27 is formed of inorganic materials such as silicon, and surrounds the light receiving portion 30. A transparent α-ray shielding glass is used as the cover glass 28, so as to prevent the pixels from being destroyed by the α-ray. Since a space between the light receiving portion 30 and the cover glass 28 is provided, the functions of the micro lens do not become worse.

The solid state imaging device 20 is produced as described below, for example. First, the silicon is superimposed on a transparent glass substrate as the substrate of the cover glass 28, and then the plural spacers 27 are formed on the glass substrate by photolithography, development, etching and so on. Next, by the adhesive applied on end faces of the spacers 27, the spacers 27 are adhered on a wafer on which a plurality of the light receiving portions 30 and the contact terminals 31 are formed, such that the each light receiving portion 30 are closed inside the spacer 27 and the glass substrate. Finally, a plurality of the solid state imaging devices 20 are obtained from dicing of the glass substrate and the wafer along inclined dicing lines such that the side surfaces the solid state imaging devices 20 become the tapered surfaces.

Note that the contact terminal 31 is formed by a method as described below. Firstly, through-holes are formed along the inclined dicing lines, and filled with conductive paste. After the conductive paste is solidified, the wafer is diced along the dicing line. Accordingly, the plurality of the contact terminals 31 are formed on the side surfaces of the semiconductor substrate 26.

The mounting board 21 is a rigid board formed of a glass epoxy substrate, a ceramic substrate or the like, and has a thickness L2 being thicker than a thickness L1 of the solid state imaging device 20. In the center of the mounting board 21, a rectangular shaped attachment opening 37 is formed. The solid state imaging device 20 is inserted into the attachment opening 37 from lower end of the opening. A mark 39, which indicates a position where the first terminal 31a of the solid state imaging device 20 is attached to the mounting board, is formed by printing or the like on the mounting board 21, near the attachment opening 37.

Figure 6:
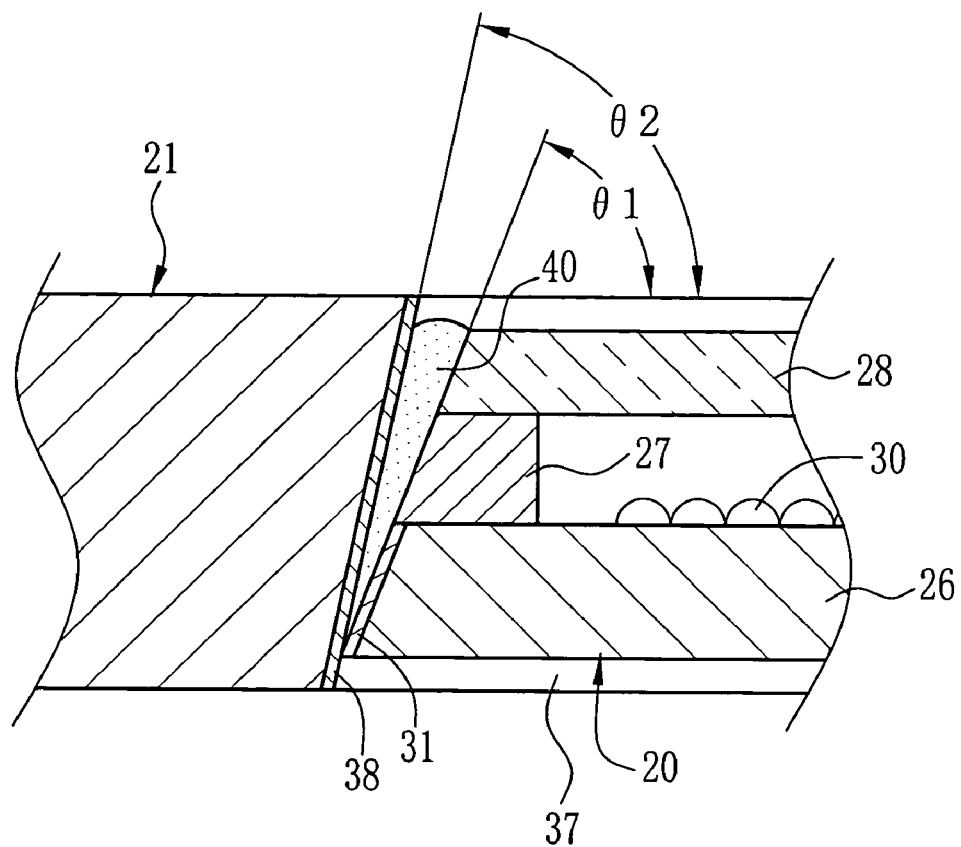
FIG. 6 is a partially sectional view showing a state of contacting between a contact terminal of the solid state imaging device and a contact terminal of a mounting board.

Internal surfaces of the attachment opening 37 are tapered surfaces which are narrowed from a bottom surface of the mounting board 21 to a top surface of the mounting board 21. On the internal surfaces, a plurality of contact terminals 38 which contacts the contact terminals 31 of the solid state imaging device 20, for electrically connecting them. As shown in FIG. 6, an inclination angle θ2 of the internal surface of the attachment opening 37, which is measured from the bottom surface thereof in counterclockwise direction, is larger than an inclination angle θ1 of the side surface of the solid state imaging device 20. In addition, the size of the bottom surface of the solid state imaging device 20 is larger than that of an upper end of the attachment opening 37, and is smaller than that of a lower end of the attachment opening 37. Accordingly, when the solid state imaging device 20 is inserted into the attachment opening 37 from lower end of the opening, the contact terminal 31, which is provided near the bottom surface of the solid state imaging device 20, is surely contacted to the contact terminal 38 of the mounting board 21.

The solid state imaging device 20 which is inserted in the mounting board 21 is fixed to the mounting board 21 by adhesive 40 or the like poured into gaps of the attachment opening 37 from the upper end thereof. Note that forming the contact terminal 38 inside the attachment opening 37 of the mounting board 21 is performed by the same method which applied to the forming of the contact terminal 31 of the solid state imaging device 20.

The optical unit 22 comprises a lens holder 43 and a taking lens 44 which is incorporated in the lens holder 43. The lens holder 43 is formed of for example a plastic, and has a cylindrical lens barrel 43a in which the taking lens 44 are incorporated. The optical unit 22 is fixed on the mounting board 21 by the adhesive, after the solid state imaging device 20 is attached on the mounting board 21.

Figure 7:
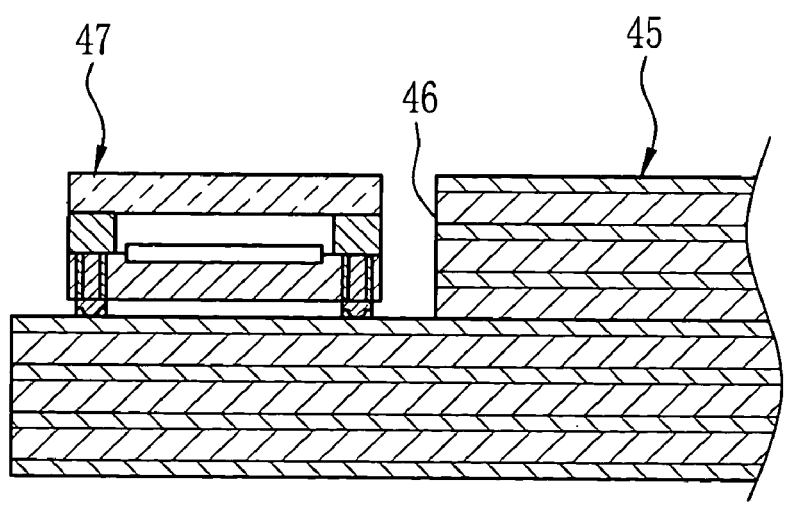
FIG. 7 is a partially sectional view of an image capture section of a mobile phone of another embodiment.

In the above embodiment, the attachment opening 37 is formed in the mounting board 21 to contain the solid state imaging device 20. However, an embodiment shown in FIG. 7 may be also preferable. In the embodiment, a recess 46 is formed in a mounting board 45 of multilayer substrate, and a solid state imaging device 47 is attached inside the recess 46. Accordingly, a thickness of optical axis direction of a camera module becomes reduced by a thickness of the solid state imaging device 47. In the above embodiment, the mark 33 which indicates the first terminal 31a is formed by printing, however, a cutout may be formed on the solid state imaging device instead of the printed mark.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image capture apparatus including a solid state imaging device which converts an image focused by a taking lens into electronic signals, comprising:
 a mounting board on which said solid state imaging device is mounted, and having a thickness which is greater than a thickness of said solid state imaging device; and
 a container portion formed in said mounting board, for containing said solid state imaging device within said thickness of said mounting board,
 wherein the container portion comprises an attachment opening which penetrates the mounting board,
 wherein a side surface of the solid state imaging device comprises a first tapered surface which is narrowed from a bottom surface to a top surface with a first inclination angle measured from the bottom surface of the solid state imaging device in a counterclockwise direction,
 wherein an internal surface of the attachment opening comprises a second tapered surface which is narrowed from a lower end of the attachment opening to an upper end thereof with a second inclination angle larger than the first inclination angle, measured from the lower end of the attachment opening in the counterclockwise direction, and
 wherein the solid state imaging device is inserted into the attachment opening from the lower end thereof.

2. An image capture apparatus as described in claim 1, wherein said solid state imaging device comprises:
 a semiconductor substrate having a light receiving portion which converts said image into said electronic signals;
 a spacer attached on said semiconductor substrate for surrounding said light receiving portion; and
 a transparent plate attached on said spacer.

3. An image capture apparatus as described in claim 2, further comprising:
 a plurality of first contact terminals formed on a side surface of said solid state imaging device, to be electrically connected to said light receiving portion; and
 a plurality of second contact terminals formed on an internal surface of said attachment opening, each of which contacts said first contact terminals to make electrical connections.

4. An image capture apparatus as described in claim 3, wherein said bottom surface of said solid state imaging device has a size greater than a size of side upper end of said attachment opening, and less than a size of said lower end of said attachment opening.

5. An image capture apparatus as described in claim 4, further comprising:
 a first indicator provided on said solid state imaging device, for indicating a position of a first terminal which is one of said first contact terminals, and acting as a fiducial for determining attachment orientation of said solid state imaging device; and
 a second indicator provided near said attachment opening on said mounting board, for indicating a position where said first terminal is attached to said attachment opening.

6. An image capture apparatus as described in claim 5, wherein said first and second indicators are formed by printing.

7. An image capture apparatus as described in claim 5, wherein said first indicator is a cutout formed on said solid state imaging device.

8. An image capture apparatus as described in claim 4, wherein said image capture apparatus is a mobile phone.

9. An image capture apparatus as described in claim 1, wherein said container portion comprises a recess formed in said mounting board which is a multilayer substrate.

10. An image capture apparatus as described in claim 2, wherein the light receiving portion and the spacer are in contact with a top surface of the semiconductor substrate.

11. An image capture apparatus as described in claim 3, wherein a bottom edge of the first tapered surface is in contact with the second tapered surface.

12. An image capture apparatus as described in claim 1, wherein a bottom edge of the first tapered surface is in contact with the second tapered surface.

13. An image capture apparatus as described in claim 1, wherein the bottom surface of the solid state imaging device has a size greater than a size of the upper end of the attachment opening, and less than a size of the lower end of the attachment opening.

14. An image capture apparatus as described in claim 1, further comprising:
 a first indicator provided on the solid state imaging device, for indicating a position of a first terminal which is one of a plurality of contact terminals, and acting as a fiducial for determining attachment orientation of the solid state imaging device; and
 a second indicator provided near the attachment opening on the mounting board, for indicating a position where the first terminal is attached to the attachment opening.

15. An image capture apparatus as described in claim 1, wherein the solid state imaging device includes a light receiving portion,
 wherein a plurality of first contact terminals are formed on a side surface of the solid state imaging device, to be electrically connected to the light receiving portion; and
 wherein a plurality of second contact terminals are formed on an internal surface of the attachment opening, each of which contacts the first contact terminals to make electrical connections.

* * * * *